United States Patent [19]
Tank et al.

[11] Patent Number: 5,200,797
[45] Date of Patent: Apr. 6, 1993

[54] DEVICE FOR MEASURING THE ANGLE OF ROTATION OR OF THE ANGULAR POSITION OF A ROTATING OBJECT

[75] Inventors: Volker Tank, Eching; Helmut Dietl, Munich; Franz Lanzl, Wessling, all of Fed. Rep. of Germany

[73] Assignee: Deutsche Forschungsanstalt fur Luft- und Raumfahrt e.v., Cologne, Fed. Rep. of Germany

[21] Appl. No.: 736,843

[22] Filed: Jul. 29, 1991

Related U.S. Application Data

[63] Continuation-in-part of Ser. No. 386,918, Jul. 31, 1989, abandoned.

[30] Foreign Application Priority Data

Aug. 1, 1988 [DE] Fed. Rep. of Germany ....... 3826149

[51] Int. Cl.$^5$ .................................................. G01B 9/02
[52] U.S. Cl. ..................................... 356/363; 356/345
[58] Field of Search ........................ 356/346, 363, 345

[56] References Cited

U.S. PATENT DOCUMENTS 3,145,251  8/1964  Woodson .......................... 356/363
4,227,807 10/1980  Pond et al. ........................ 356/363

FOREIGN PATENT DOCUMENTS

2456649 11/1974  Denmark .
0146768 11/1984  European Pat. Off. ............ 356/363
3431040  8/1984  Fed. Rep. of Germany ...... 356/363
1541747 10/1968  France .
2252557 11/1974  France .

Primary Examiner—Samuel A. Turner
Attorney, Agent, or Firm—Browdy and Neimark

[57] ABSTRACT

An optical interferometer used for measuring the rotational angle or the anglular position of a rotating object, in which a path deflection is caused by means of the rotation of a reflector, the rotational movement of which is coupled with that of the object to be measured and thus is synchronous with its rotation. Furthermore, a laser beam is introduced into the interferometer. The path deflection caused by the rotation of the retroreflector creates in the introduced laser beam varying interferences of defined wave length, which are proportional to the rotational angle of the reflector and of the object to be measured which drives it. Furthermore, the angular resolution is inversely proportional to the wave length of the laser beam.

16 Claims, 6 Drawing Sheets

DEVICE FOR MEASURING THE ANGLE OF ROTATION OR OF THE ANGULAR POSITION OF A ROTATING OBJECT

BACKGROUND OF THE INVENTION

This application is a continuation-in-part of Ser. No. 07/386,918 filed Jul. 31, 1989, now abandoned.

1. Field of the Invention

The invention relates to a device for measuring the angle of rotation or of the angular position of a rotating object by using an optical interferometer with a rotatable retro-reflector, the rotational axis of which is laterally displaced with respect to its axis of symmetry in relation to the center of symmetry, and the rotational axis and plane of symmetry of which enclose the same angle as the rotational axis of the retro-reflector and the optical axis of the interferometer, having a beam splitter, fixed plane mirrors disposed vertically with respect to one another, and a detector wherein a path deflection is caused by means of rotation of the retro-reflector.

2. The Prior Art

At present, electro-magnetic or electro-optical angle coders, angle transmitters or pulse transmitters are used for measuring the angle of rotation. However, these devices have the disadvantage that only a very limited angular resolution and only a limited angular exactness is possible because of the mechanical coding disks in the form of shadow masks or of magnetic coding disks used and that great efforts are required to achieve relatively large resolutions and exactness.

SUMMARY OF THE INVENTION

Thus, it is an object of the invention to provide a device for measuring the angle of rotation or of the angular position of a rotating object by means of which very high angular resolution and angular exactness can be achieved with small effort.

In accordance with the present invention, this is made possible in a device in which the rotating object to be measured is centered with respect to a shaft of the retro-reflector, so that the rotational movement to the retro-reflector is synchronous with that of the rotating object, and the beam of a laser source with a defined wavelength used as single source is introduced into the interferometer in such a way that by means of this laser beam routed via the beam splitter, the fixed mirrors and the retro-reflector, laser interferences are generated and registered by the single detector which have a cosine relationship to path differences generated by the rotation of the retro-reflector and thus a cosine relationship to the rotational angle of the retro-reflector or the rotating object. Advantageous improvements are contained in the dependent claims.

In accordance with a second embodiment of the present invention, a refracting optical wedge is used between one of the fixed mirrors and the retro-reflector and the rotating object to be measured is coupled to a shaft of the retro-reflector so that the rotational movement of the retro-reflector is synchronous with that of the rotating object, and the beam of a laser source with a defined wavelength used as single source is introduced into the interferometer in such a way that by means of this laser beam routed via the beam splitter, the fixed mirrors, the retro-reflector and the refracting optical wedge, these interferences are generated and registered by the single detector, which have a cosine relationship to path differences generated by the varying thickness of the refracting optical wedge and thus a cosine relationship to the rotational angle of the retro-reflector or the rotating object.

In the device according to the invention, preferably two optical interferometers according to Michelson with rotating path deflection in accordance with German Published, Non-examined Patent Application DE-OS 33 46 455.3 or German Patent 34 31 040 are used. In accordance with the invention, the rotating mirror element, preferably in the form of a retro-reflector, of each of such an interferometer is coupled with the rotating object to be measured, so that the mirror element is made to rotate by the "object to be measured" and thus performs the same rotational movement as the latter.

Furthermore, the radiation of a laser source which in a conventional interferometer used as spectrometer serves as reference source is introduced according to the invention as the actual signal source into the interferometer in that the laser radiation is brought to interference in known manner by a beam divider, two fixed mirrors and a retro-reflector and the laser interferences are registered only by a single detector sensitive to this laser radiation, for example in the form of a silicon photodiode.

In accordance with the invention the rotational movement made by each retro-reflector and thus the path deflection in the arms of each interferometer is a function of the cosine of the angular position of the rotating retro-reflector. This path deflection is detected through changing laser interferences by the single detector, by means of which according to the invention the angular position of the retro-reflector and thus that of the object is measured. The shorter the wave length of a used laser beam is, the higher the angular resolution of the device for measuring the angle of rotation. The changing of the laser interferences results in an alternating signal at the detector which is registered in a known manner; for example, a simple counter may be used for this which counts the appearing pulse flanks and in this way registers the individual alternating actions.

BRIEF DESCRIPTION OF THE DRAWINGS

The invention is described in detail below by means of preferred exemplary embodiments making reference to the attached drawings, in which.

DETAILED DESCRIPTION OF THE DRAWINGS

Figure 1:
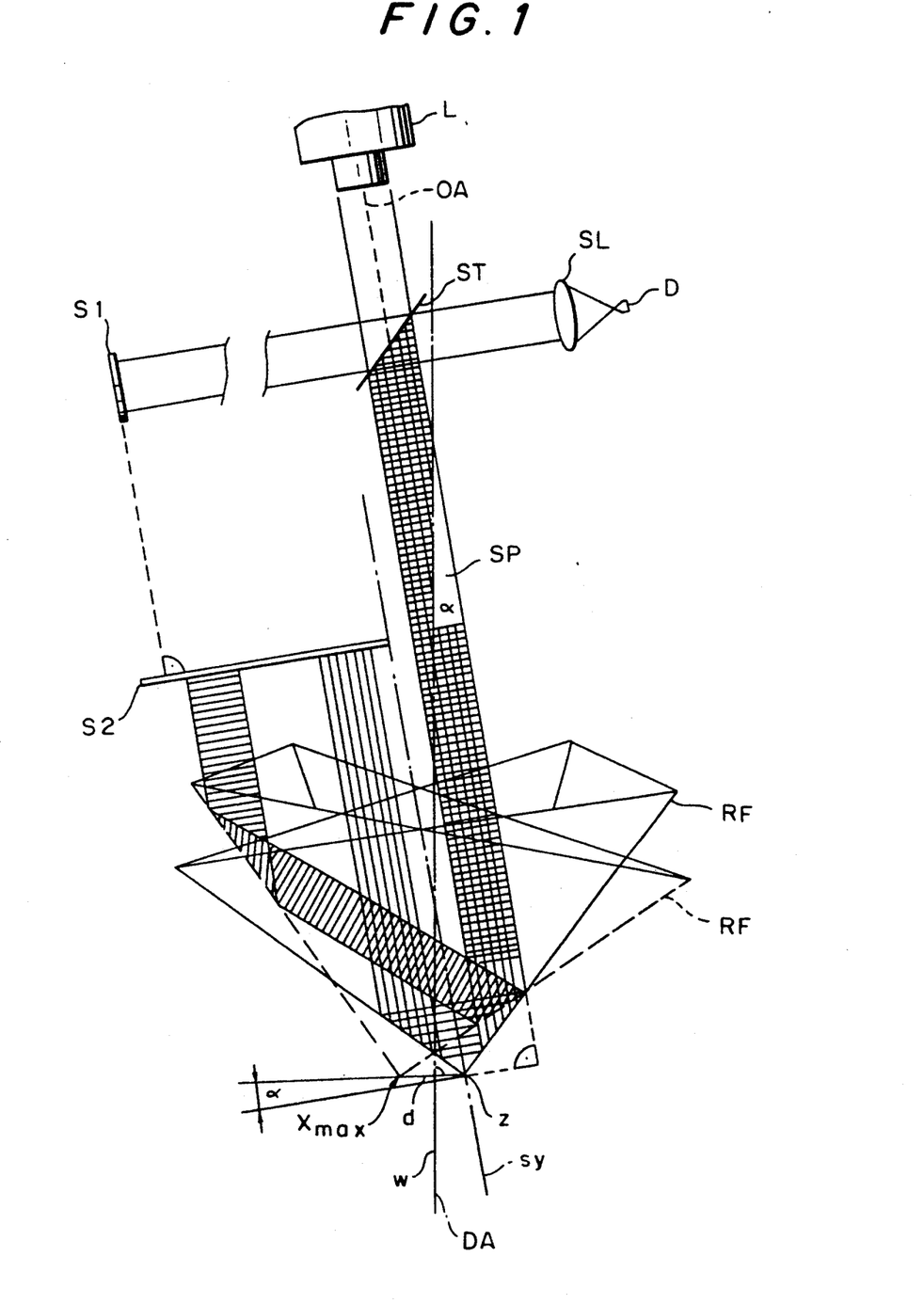
FIG. 1 is an embodiment of a device for measuring the angle of rotation in accordance with the invention wherein an interferometer with an inclined, rotating retro-reflector is provided.

An interferometer conventional in construction is shown in FIG. 1, comprising a first fixed plane mirror S1, a second fixed plane mirror S2 vertically disposed with respect to mirror S1, a beam splitter ST disposed at an angle of 45° with respect to the two mirrors S1 and S2, and a rotatable retro-reflector RF. The rotational axis DA of the latter is laterally displaced by a distance d in relation to the center Z of the reflector, i.e., the point of the reflector, and is inclined by an angle $\alpha$ in relation to the axis of symmetry SY, i.e. the axis which extends concentrically to the edges of the reflector through its center Z; furthermore, its rotational axis DA is inclined by preferably the same angle $\alpha$ in relation to the optical axis OA of the system. In FIG. 1 the retro-reflector RF is shown in two positions, the one shown by dashed lines is rotated by 180° in comparison to the position shown by solid lines.

Additionally, the interferometer comprises a single detector D and a laser source L, used as signal source, the beam of which preferably extends parallel to the mirror S1 and vertically to the mirror S2, i.e. congruent with the optical axis OA.

Furthermore, a shaft W is rigidly connected to the retro-reflector RF, not shown in detail, which is disposed concentrically to the rotational axis DA. The optical axis OA and the rotational axis DA preferably intersect at a point SP. The shaft W must be connected with a rotational axis of the object to be measured, also not shown in detail, and the angular position of which is to be determined.

The lengths of the paths through the two arms of the interferometer, namely via the beam splitter ST to the mirror S1 and via the beam splitter ST to the mirror S2, are of approximately the same length; however, this is not absolutely necessary because the source of the beam is a laser L having a large coherence length; therefore a compact structure, corresponding to the interferometer device of FIG. 1, can be realized.

During continuous rotation of the retro-reflector RF the path length of the beam periodically changes in this interferometer arm that is in each revolution from a minimum—corresponding to the position of the retro-reflector shown in dashed line-path length to a maximum—corresponding to the full line position of the retro-reflector—and back to a minimum path length again. The path length in the arm of the interferometer with the mirror S1 remains unchanged, so that the two halves of the beam from the two arms of the interferometer brought together at the beam splitter ST are subject to phase differences proportional to the path differences, which results in periodically changing interferences which are registered at the detector D. For this purpose the beam is focused on the detector D by means of a focusing lens SL. The number of the interference changes which occur, and thus the angular resolution of the device, is proportional to the maximal optical path difference $\Delta_{max}$ and inversely proportional to the wave length of the laser L.

Figure 2:
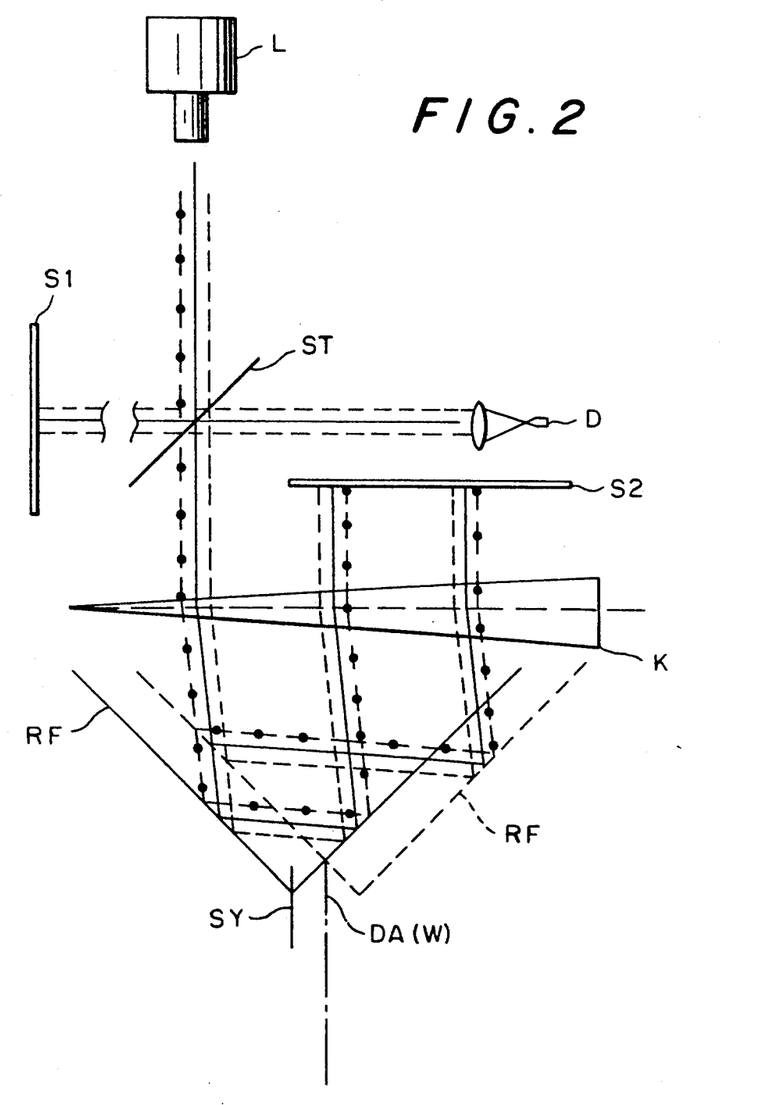
FIG. 2 is a further embodiment of a device for measuring the angle of rotation according to the invention wherein an interferometer with a rotating retro-reflector and with a refracting optical wedge is provided.

FIG. 2 illustrates a further embodiment of the device according to the invention, the same elements as those in the embodiment according to FIG. 1 being designated with the same reference numerals and not being separately described below.

In FIG. 2 a correspondingly designed interferometer has in addition a refracting optical wedge K, where the rotational axis DA of the retro-reflector RF, shown similar to FIG. 1 in two positions different by 180°, may extend parallel to the axis of symmetry SY and to the optical axis OA. In this case, the path difference is achieved by a deflection of the laser beam L and thus by passing through different thicknesses of the refracting optical wedge K.

Figure 3:
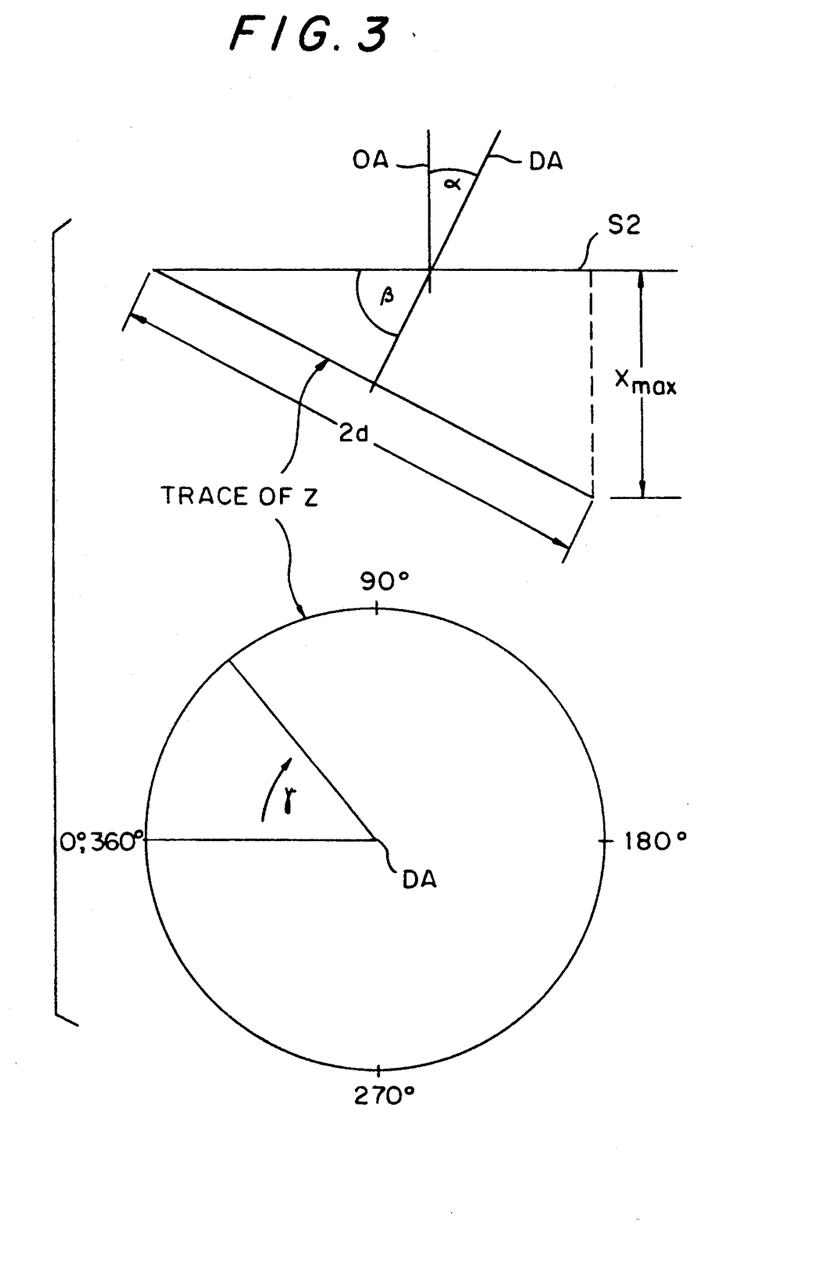
FIG. 3 is a schematic drawing from which the relation between path deflection and angular position can be noted.

The track of the center Z of the retro-reflector RF is shown in FIG. 3 in lateral view and top view. The rotational axis DA, the parallel displaced second fixed mirror S2 as reference plane of the path deflection x, and the optical axis OA are schematically shown. The angle $\beta$ is the inclination angle of the rotational axis DA with respect to the second fixed mirror S1; $\beta = 90° - \alpha$ holds for the angle $\beta$. The rotational angle of the retro-reflector RF is designated by $\gamma$ and is counted from the minimal path difference $x_{min}$ with $\gamma = 0°$ to the maximal path difference $x_{max}$ with $\gamma = 180°$ and back again to the minimal path difference with $\gamma = 360°$. The maximal path difference $x_{max}$ between the mirror S2 and the retro-reflector RF is, as can be seen from FIG. 3, as follows:

$$x_{max} = 2d \cos \beta \tag{1}$$

Thus, the maximal optical path difference $\Delta_{max}$ is:

$$\Delta_{max} = 8d \cos \beta \tag{2}$$

because the laser beam transits the arm with the retro-reflector RF four times.

The optical path difference $\Delta$ as a function of the rotational angle $\gamma$ then follows from:

$$\Delta = 4d\ tg\ \alpha\ (1 - \cos \gamma) \tag{3}$$

The result for the rotational angle $\gamma$ is:

$$\gamma = \arccos \frac{4 tg\alpha - \Delta}{4d tg\alpha} \tag{4}$$

The optical path difference $\Delta$ then follows via the measured laser interferences from the laser wave length $\lambda$, $d\Delta$ being $\lambda/2$ from one interference to the next.

For an angle $\gamma > 180°$, it follows from:

$$\gamma = 180° + \arccos \frac{4 tg\alpha - \Delta}{4d tg\alpha} \tag{5}$$

Below it is intended to estimate the possible angular resolution of the device according to the invention by means of a numerical example. Because the path difference from minimum to maximum and back to minimum is traversed in the course of one revolution and with $\beta = 80°$, $d - 1$ cm, $\lambda = \mu m$ and $\Delta_{max} = 1.38$ cm $= 13.8 \times 10^3 \mu m$, the average angular resolution follows as $$\frac{4\Delta_{max}}{\lambda} = 87.899 \times 10^3 \text{ pulses/revolution}$$

If, instead of an assumed HeNe laser, a UV laser with a wave length of, for example, $\lambda=100$ nm is used, a value of $5.55520\times 10^5$ pulses/revolution results. It is of course possible to change the dimensions of $\beta$ and d in the direction of an even higher angular resolution.

It is possible to perform angular measurements of extremely high resolution by means of the invention, the exactitude of which is a given of the wave length of the laser beam. In regard to exactitude and resolution, the device in accordance with the invention surpasses by orders of magnitude the customary methods and devices.

Any known retro-reflector which, by definition, reflects an incoming beam parallel to itself (as a rule laterally displaced) can be used as retro-reflector, thus, for example, triple mirrors, spherical retro-reflectors and the like.

Triple mirrors comprise, for example, three reflecting surfaces arranged vertically to each other. Particularly advantageous are triple mirrors made from a massive "cube corner" of a material which is translucent to the beam of a laser. The three surfaces vertical to each other are provided on the outside with a coating which reflects the laser beam, while the fourth surface remains without a coating and thus translucent to the beam and forms the entry and exit surface for the laser beam. (If need be, it would be possible to provide it with an anti-reflection layer).

The advantage of a massive retro-reflector lies in that it maintains its shape and thus its optical properties even at high rpm and that therefore the operation of the device is not influenced by it.

Quartz may be used as the material for a massive triple mirror which permits the penetration of visible and ultraviolet radiation down to a wave length of approximately 150 nm. When using other materials known from optical technology, operation of the device is also possible with shorter wave lengths of a laser. Of course, the retro-reflector must be balanced, which is easy to do with massive cube corners.

The above recited equations (3) to (5) are valid with regard to a zero position defined by the minimal path difference. It is possible to determine this in a known manner during adjustment of the device by means of an additional electro-optical or electromagnetic pulse transmitter. It is also possible to determine the zero position from the "white light signal" known from interferometry; for this purpose the interferometer arms must be set to the same length in the zero position. Additionally, a white light source and a white light detector in the interferometer are required.

The rotational direction can be determined in a known manner in additional steps. Counting of the laser interferences can take place by means of a forward-backward counter which is controlled by the interference flanks and the rotational direction transmitter. A logic circuit must be added to the counter which calculates, for example with the aid of equations (4) and (5), the respective rotational angle or reads it out from a stored table. Finally, the calculated rotational angle can be displayed via a further electronic circuit.

Figure 4:
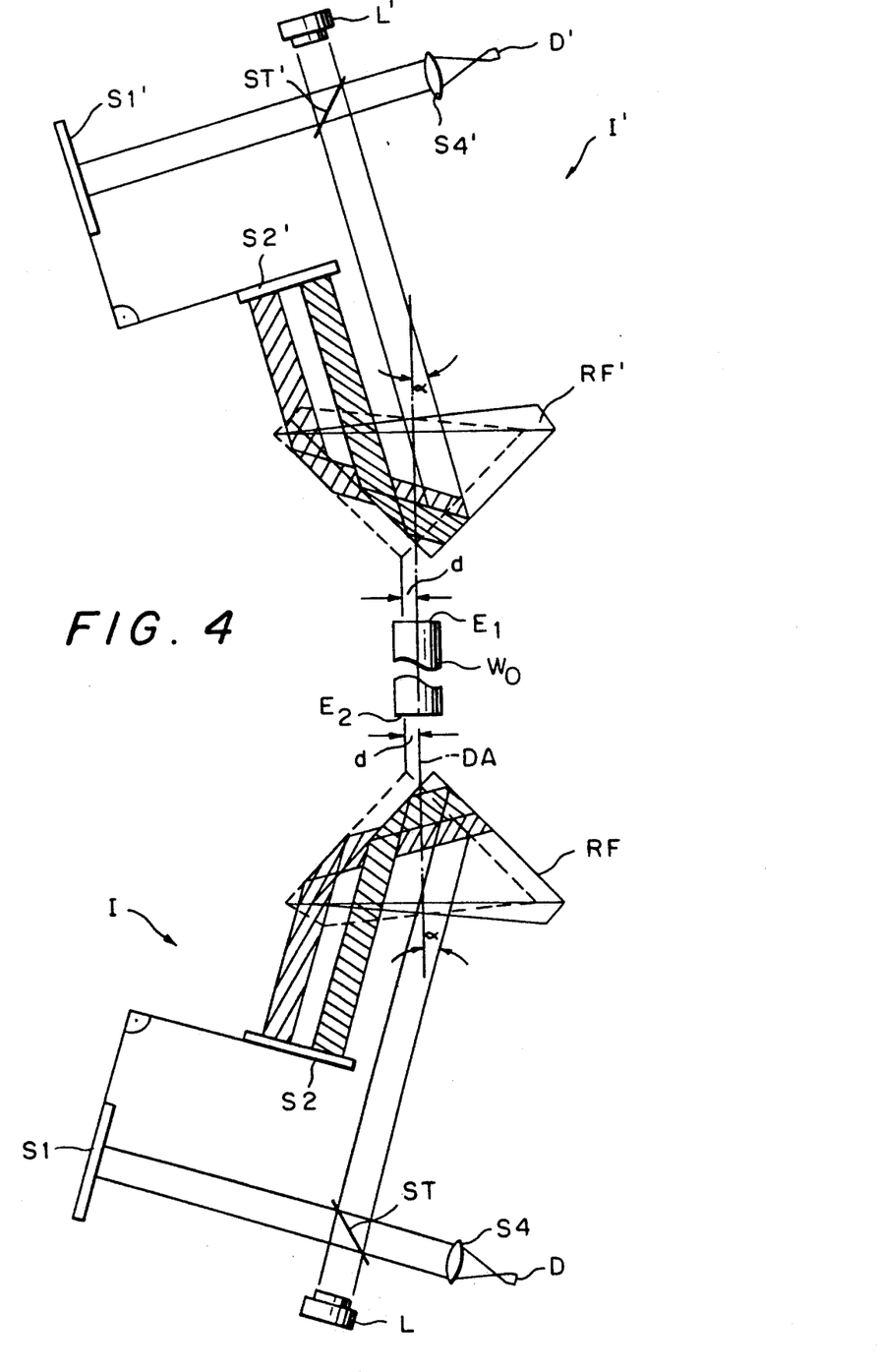
FIG. 4 shows a further embodiment of a device for measuring the angle of rotation according to the invention in which two interferometers each having a rotating retro-reflector are connected to a respective one of the two ends of a shaft of a test object.

From a production engineering viewpoint it is of particular advantage that a change in the angular resolution can be achieved within one and the same structure by simply changing the laser source used as signal source and thus changing the wave length. Furthermore, it is possible to increase the angular resolution by means of electronic frequency multiplication of the detector signal. In order to linearize the cosine-shaped extent of the angular resolution of the device according to the invention, for measuring the angle of rotation, as indicated schematically in FIG. 4 preferably two rotating retroreflectors RF and RF' are provided. The two retroreflectors RF and RF' are offset with respect to each other with regard to the angle of rotation in the maximum path deflection. Furthermore, the shafts of the two retroreflectors RF and RF', not shown in detail, of the two interferometric arrangements I and I' are connected to the two ends $E_1$ and $E_2$ of an only schematically indicated rotatating shaft $W_0$ of a test object, not illustrated. The two schematically illustrated interferometric arrangements I and I' have equally formed fixed mirrors S1 and S1', S2 and S2', equally formed beam dividers ST and ST', the identically formed retroreflectors RF and RF', the identical laser sources L and L' serving as signal sources, identically formed collecting lenses SL and SL' and identically formed detectors D and D'. For simplification, the two schematically indicated interferometric arrangements I and I' are illustrated in FIG. 4 projected into a plane, that is the plane of the drawings. In a practical embodiment the two interferometric arrangements I and I' are aligned at an angle of 90° to each other; this means that if for example the fixed mirror S1 of the interferometric arrangement I is aligned perpendicularly to the plane of the drawings the corresponding fixed mirror S1' of the interferometric arrangement I' is arranged in the plane of the drawings and the remaining elements S2', ST' and RF are likewise turned through 90° so that the association apparent from FIG. 4 is retained.

A linearisation can also be achieved in that two or more, for example four, laser beams with mutually inclined optical axes and in planes offset from each other are directed into a single retroreflector. For this purpose, for each of the laser beams an arrangement comprising two fixed mirrors, a beam divider and a detector is required. Expediently, the optical axes of all the laser beams used have here the same angle of inclination to the axis DA of rotation of the retroreflector and intersect in the same point SP.

Thus, the laser beams are disposed concentrically and symmetrically in respect to the rotational axis DA. All beam splitters are at an angle of 45° with respect to the optical axis OA of the respective associated laser beam; one of the fixed mirrors is disposed parallel and the other mirror vertically to the associated optical axis. By means of this set up the maximal optical path differences are the same for each laser beam and the cosine relationship of the path differences is phase-shifted from beam to beam.

The phase is a function of the angle formed by the planes of incidence. Planes of incidence are those planes which spread out between the respective optical axes OA and the rotational axis DA of the retro-reflector RF. If, for example, two laser beams are used and their planes of transmission form an angle of 90° with each other, the phase of the cosine relationship is exactly 90°, i.e., the linear area of the one beam falls into the non-linear area of the other, which is desired.

The individual laser sources and the laser beams eminating therefrom are arranged concentrically and symmetrically about the reflector axis DA of rotation which according to the invention is connected to one end of the shaft of a test object.

Figure 5:
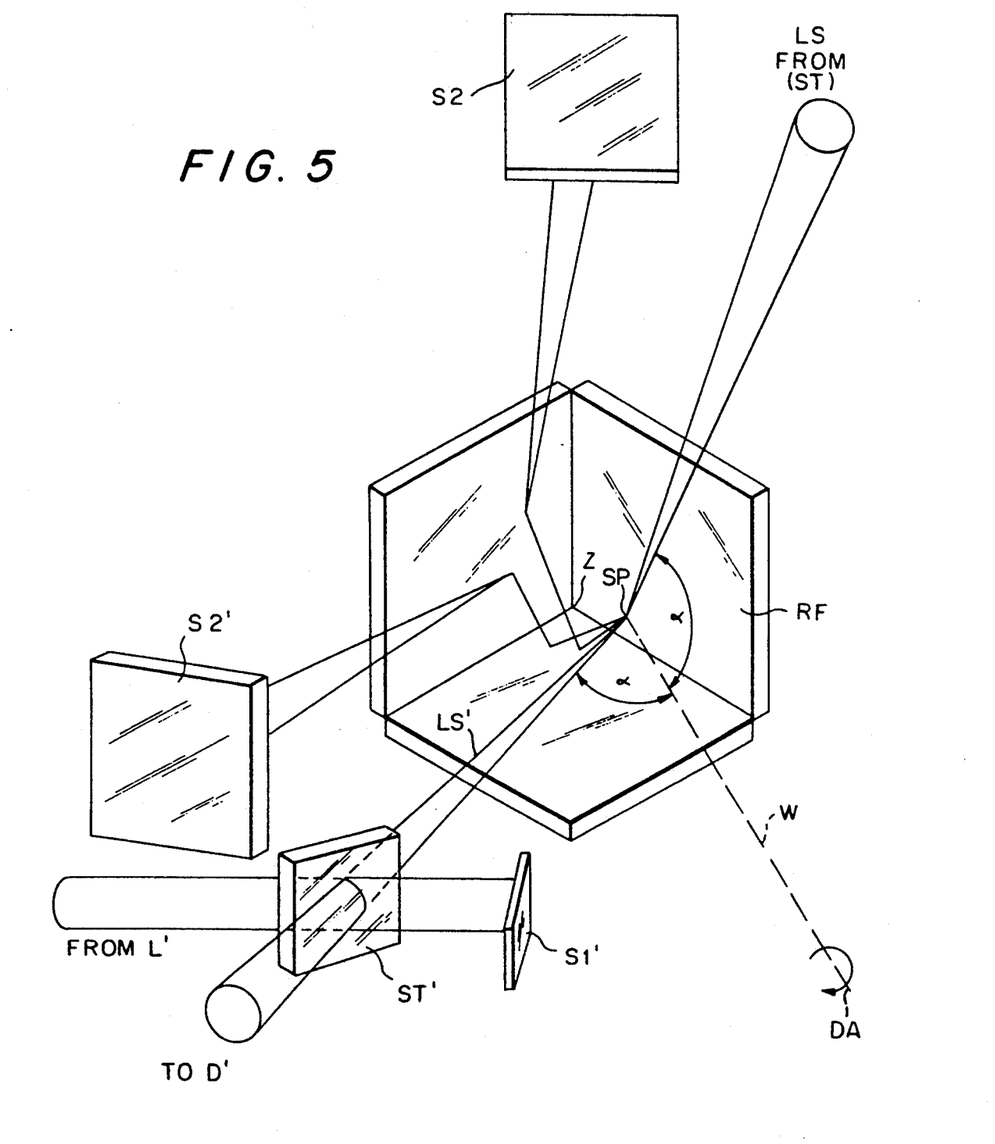
FIG. 5 shows a further embodiment of a device for measuring the angle of rotation according to the invention in which two interferometric arrangements are associated with a single retro-reflector, the rotary shaft of which is connected to one end of a shaft of a test object.

In FIG. 5, in schematic and perspectively simplified manner an embodiment is shown having two interferometric arrangements which in makeup and alignment each correspond to the interferometric arrangement of FIG. 1. From two laser sources not illustrated in FIG. 5 and serving as signal sources two laser beams LS and LS' are emitted which in FIG. 5 strike a rotating retro-reflector RF in the point SP. Here, of an arrangement illustrated in the upper part of FIG. 5 only the fixed mirror S2 is shown whilst of the second arrangement shown in the lower part of FIG. 5 apart from the fixed mirror S2' the other fixed mirror S1' and the beam divider ST' are schematically illustrated. For simplification and clarification of the illustration in FIG. 5, apart from the two laser sources in each case the two collective lenses and the two detectors following them have been omitted. The second arrangement, of which in FIG. 5 the elements S1', S2', ST' are shown, is arranged turned through 90° about the axis DA of rotation with respect to the first arrangement, of which as already mentioned in FIG. 5 only the fixed mirror S2 is shown, and is adjusted in this position. Expediently, however, in the embodiment according to FIG. 5 only a single laser source is employed, the beam of which is divided by corresponding beam dividers into two (or more) beams which are deflected by deflecting mirrors into the desired direction.

Figure 6:
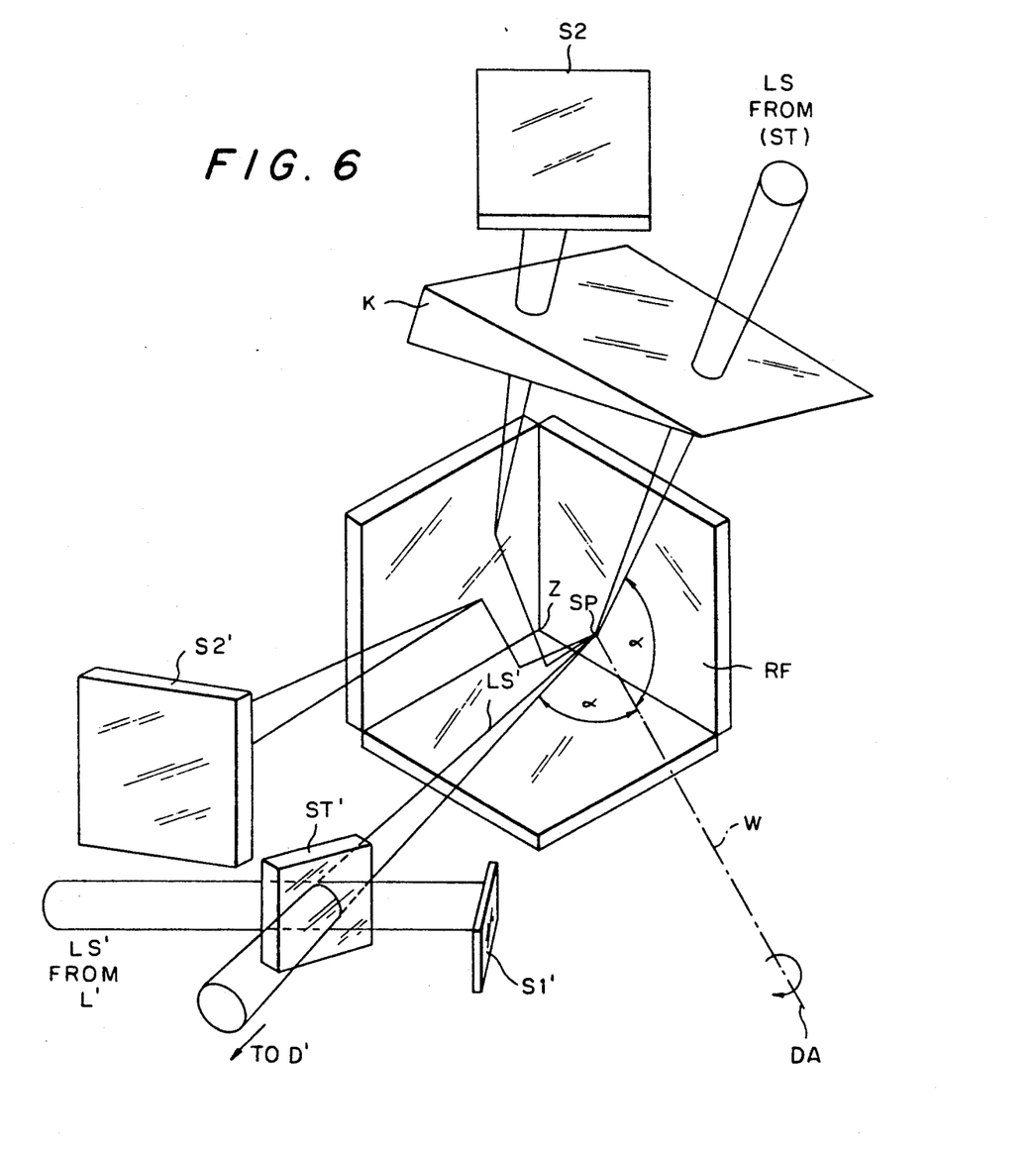
FIG. 6 shows a further embodiment of a device for measuring the angle of rotation according to the invention in which in each of the interferometric arrangements of FIG. 5 an additional refracting wedge is provided.

In an arrangement for linearisation of a device according to FIG. 2, as shown in an embodiment in FIG. 6 for two beams, for each further beam a refractive wedge is to be provided. In FIG. 6 an additional wedge K' is shown only in the upper part whereas for clarification and simplification of the illustration a corresponding wedge in the lower part of FIG. 6 has been omitted. Apart from the wedge K' illustrated (and the corresponding wedge in the lower part of FIG. 6 which is not illustrated) the embodiment according to FIG. 6 corresponds to the embodiment of FIG. 5 and consequently further description of FIG. 6 would be superfluous.

It is advantageous to use only one single laser source for such an arrangement, the beam of which is separated by means of respective beam splitters into one or more bundles of beams which are turned into the desired direction by tilted mirrors.

In a device for linearizing a device in accordance with FIG. 2, its is also required to provide an additional refracting optical wedge for each additional beam. The wedges are aligned in each case in such a way that they extend vertically with respect to the optical axis (OA) and to the rotational axis DA, a plane of symmetry, by which the wedges are divided into mirror-symmetrical halves, lying in the plane defined by these two axes. The individual laser beams run parallel and are disposed concentrically around the rotational axis. Here too, every additional arrangement consisting of fixed mirrors, beam splitter, collecting lens, detector and wedge is turned around the rotational axis by a set angle, for example 90°, in relation to corresponding existing arrangements.

All of the described linearization arrangements with two or more laser beams and reflector arrangements can also be used for increasing the angular resolution. For this purpose the arrangements consisting of a beam splitter and the two fixed mirrors are fixed in such a way that they have between them different path differences through the two interferometer arms. This can be accomplished by variable selection the inclination angle $\alpha$ and/or the distance d. By means of this selection, the laser interferences of the individual arrangements occur phase-shifted with respect to each other, allowing an increase in the angular resolution to be achieved.

If an amount n of laser beams or of reflector arrangements is used, also the mirrors and beam splitters are fixed in such a way that the optical path differences are different by exactly $\lambda/n$ from one to the next arrangement; then the angular resolution is greater by the factor of n than with the simple arrangement. The occurring maxima and minima of the laser interferences of the several arrangements then are offset from each other by the optical phase $\lambda/n$; i.e., they occur at different angular positions.

Fine adjustment of the fixed mirrors can be made, for example, with piezo-ceramic adjustment elements, wherein these adjustment elements are used as mirror supports. The path through a respective interferometer arm is adjusted in such a way that the associated interference extremes have the desired phase in respect to the others.

It is possible to determine the frequency of the laser interferences occurring per unit of time by means of a timed rate of a defined frequency and to determine from this the rotational speed or the rpm of the object to be measured. The equations (3) to (5) mentioned above are used for this in an analog manner for the calculations. Thus, the device according to the invention can also be used for rpm measurements or rotational speed measurements.

The device according to the invention is particularly suitable for applications where projections of rotation indicators which have cosine relationships must be considered. Every available laser is suitable for this, for example also an X-ray laser, but also every radiation source the coherence length of which is at least as great as the largest path difference during the rotation of the reflector. Laser diodes or the like are also usable.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In at least one optical interferometer comprising a rotatable retro-reflector having a rotational axis laterally displaced with respect to the plane of symmetry thereof in relation to the center of symmetry thereof, the rotational axis and the axis of symmetry enclosing the same angle as the rotational axis of the retro-reflector and the optical axis of the interferometer, a first beam splitter, a first set of two fixed plane mirrors disposed vertically with each other, and a first detector, wherein a path deflection is caused by means of rotation of the retro-reflector;

an improvement for measuring the rotational angle or the angular position of a rotating object comprising:

a first shaft engaged to said retro-reflector;

an axis of said first shaft being concentric to said rotational axis of said retro-reflector;

said first shaft connected with a second shaft of said rotating object to be measured;

the rotational movement of the retro-reflector and said first shaft and said second shaft being synchronous with that of the rotating object;

wherein at least one laser source for generating a beam with a defined wave length used as signal source and introduced into the interferometer in such a way that by means of said laser beam routed via said first beam splitter, said first set of fixed mirrors and the retro-reflector, laser interferences are generated and registered by said first single detector which have a cosine relationship to path differences generated by the rotation of the retro-reflector and thus a cosine relationship to the rotational angle of the retro-reflector and said rotating object.

2. The improvement in accordance with claim 1, wherein at least two interferometers are usable with said improvement for the measurement of the same rotational movement, said at least two interferometers being oriented with respect to each other in such a way that their planes of incidence defined by their respective optical axes and the common rotational axis, enclose an angle of 90° or less such that the cosine relationships measured by said at least two interferometers are offset from each other by 90° or less with respect to each other, and only the linear area of the cosine relationship is used for angular measurement in sequence by each of said at least two interferometers, and wherein said first shaft engaged to each of said two interferometers are each respectively fixed to one of two ends of said second shaft of the rotating object to be measured.

3. The improvement in accordance with claim 1, wherein the angular resolution of the interferometer is variable by a change of the angle between the plane of symmetry and the rotational axis of the retro-reflector.

4. The improvement in accordance with claim 1, wherein the angular resolution of the interferometer is variable by a change of the distance between the center of symmetry and the rotational axis of the retro-reflector.

5. The improvement in accordance with claim 1, wherein the retro-reflector is a massive element.

6. The improvement in accordance with claim 5, wherein the materials for the massive element are preferably quartz or lithium fluoride for lasers with visible or ultraviolet wave lengths.

7. The improvement in accordance with claim 2, wherein, with said at least two interferometers having at least two retro-reflector arrangements, respectively, the laser beam, because of variations in the inclination angle and/or distance, indicates different path differences in such a way that their interference signals are phase-shifted in regard to each other and in this way an increase in the angular resolution is achieved.

8. In at least one optical interferometer comprising a rotatable retro-reflector having a rotational axis laterally displaced with respect to the plane of symmetry thereof in relation to the center of symmetry thereof, the rotational axis and the axis of symmetry enclosing the same angle as the rotational axis of the retro-reflector and the optical axis of the interferometer, a first beam splitter, a first set of two fixed plane mirrors disposed vertically with each other, and a first detector, wherein a path deflection is caused by means of rotation of the retro-reflector;

said interferometer further including a first refracting optical wedge disposed between one of said two fixed plane mirrors and said retro-reflector;

an improvement for measuring the rotational angle or the angular position of a rotating object comprising:

a first shaft engaged to said retro-reflector;

an axis of said first shaft being concentric to said rotational axis of said retro-reflector;

said first shaft coupled to a shaft of the rotating object to be measured such that the rotational movement of the retro-reflector and said first shaft and said second shaft being synchronous with that of the rotating object; and wherein at least one laser source for generating a beam with a defined wave length used as signal source and introduced into the interferometer in such a way that by means of said laser beam routed via said first beam splitter, said first set of fixed mirrors, the retro-reflector and said first refracting optical wedge, laser interferences are generated and registered by said first single detector, which have a cosine relationship to path differences generated by the varying thickness of the refracting optical wedge and thus a cosine relationship to the rotational angle of the retro-reflector and said rotating object.

9. The improvement in accordance with claim 8, wherein at least two interferometers are usable with said improvement for the measurement of the same rotational movement, said at least two interferometers being oriented with respect to each other in such a way that their planes of incidence defined by their respective optical axes and the common rotational axis, enclose an angle of 90° or less such that the cosine relationships measured by said at least two interferometers are offset from each other by 90° or less with respect to each other, and only the linear area of the cosine relationship is used for angular measurement in sequence by each of the at least two interferometers, and wherein said first shaft engaged to each of said two interferometers are each respectively fixed to one of two ends of said second shaft of the rotating object to be measured.

10. The improvement in accordance with claim 8, wherein the angular resolution of the interferometer is variable by a change of the angle between the plane of symmetry and the rotational axis of the retro-reflector.

11. The improvement in accordance with claim 8, wherein the angular resolution of the interferometer is variable by a change of the distance between the center of symmetry and the rotational axis of the retro-reflector.

12. The improvement in accordance with claim 8, wherein the retro-reflector is a massive element.

13. The improvement in accordance with claim 12, wherein the materials for the massive element are preferably quartz or lithium fluoride for lasers with visible or ultraviolet wave lengths.

14. The improvement in accordance with claim 9, wherein, with said at least two interferometers having at least two retro-reflector arrangements, respectively, the laser beam, because of variations in the inclination angle and/or distance, indicates different path differences in such a way that their interference signals are phase-shifted in regard to each other and in this way an increase in the angular resolution is achieved.

15. The improvement according to claim 1, comprising:

a plurality of said at least one laser source;

each laser beam generated by said plurality of said at least one laser source, in addition to that of said laser beam of said at least one laser source, also respectively routed via an arrangement of another beam divider, set of two fixed mirrors, and detector identical in shape and relative position to the arrangement of said first beam divider, said first set of two fixed mirrors, and said first detector;

said plurality of said at least one laser source having mutually inclined optical axes lying in planes including said rotation axis of said rotatable retro-reflector;

said planes intersecting at 90° or less with each other;

wherein a portion of said each laser beam strikes said rotatable retro-reflector along the same path during operation.

16. The improvement according to claim 8, comprising:

a plurality of said at least one laser source;

each laser beam generated by said plurality of said at least one laser source, in addition to said laser beam of said at least one laser source, also respectively routed via an arrangement of another beam divider, set of two fixed mirrors, refracting optical wedge and detector identical in shape and relative position to the arrangement of said first beam divider, said first set of two fixed mirrors, said first refracting optical wedge and said first detector;

said plurality of said at least one laser source having mutually inclined optical axes lying in planes including said rotation axis of said rotatable retro-reflector;

said planes inclined 90° or less to each other;

wherein a portion of said each laser beam strikes said rotatable retro-reflector along the same path during operation.

* * * * *